(12) United States Patent
Otsuka et al.

(10) Patent No.: US 8,849,755 B2
(45) Date of Patent: Sep. 30, 2014

(54) CONFIGURATION INFORMATION MANAGEMENT APPARATUS AND DICTIONARY GENERATION METHOD OF CONFIGURATION INFORMATION MANAGEMENT APPARATUS

(75) Inventors: Hiroshi Otsuka, Kawasaki (JP); Yuji Wada, Kawasaki (JP); Masazumi Matsubara, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 12/929,942

(22) Filed: Feb. 25, 2011

(65) Prior Publication Data

US 2011/0218982 A1 Sep. 8, 2011

(30) Foreign Application Priority Data

Mar. 8, 2010 (JP) ................................ 2010-050977

(51) Int. Cl.
*G06F 17/30* (2006.01)
(52) U.S. Cl.
CPC .............................. *G06F 17/30566* (2013.01)
USPC ............ 707/634; 707/635; 707/792; 707/803
(58) Field of Classification Search
USPC ........................................................ 707/634
See application file for complete search history.

(56) References Cited

U.S. PATENT DOCUMENTS

| | | | |
|---|---|---|---|
| 7,392,255 B1 | 6/2008 | Sholtis et al. | |
| 2002/0099787 A1* | 7/2002 | Bonner et al. | 709/216 |
| 2006/0080299 A1 | 4/2006 | Shimogori et al. | |
| 2006/0259470 A1 | 11/2006 | Chandrasekharan et al. | |
| 2007/0088977 A1* | 4/2007 | Eguchi et al. | 714/6 |
| 2007/0150495 A1 | 6/2007 | Koizumi et al. | |
| 2007/0233656 A1* | 10/2007 | Bunescu et al. | 707/3 |
| 2008/0288889 A1* | 11/2008 | Hunt et al. | 715/810 |

FOREIGN PATENT DOCUMENTS

| | | |
|---|---|---|
| JP | 2004-86782 | 3/2004 |
| JP | 2006-099236 | 4/2006 |
| JP | 2007-179146 | 7/2007 |
| WO | 03/060751 A1 | 7/2003 |

OTHER PUBLICATIONS

"CMDA Federation (CMBDf) " Committee Draft Version 1.0 [online]; URL:http://cmbdf.org/schema/1-0-0/CMDBF%20v1.0.pdf Oct. 22, 2007; pp. 1-84.
British Search Report mailed Jun. 24, 2011 in corresponding British Patent Application GB1103289.3.

* cited by examiner

*Primary Examiner* — Mohammad S Rostami
(74) *Attorney, Agent, or Firm* — Staas & Halsey LLP

(57) ABSTRACT

A data management unit stores therein configuration items including attribute items described according to different schemas. A dictionary candidate retrieval unit specifies a combination of a pair of attribute items, which defines a correspondence relation between the attribute items of the different schemas, as a dictionary definition item, and retrieves, as a dictionary candidate, a combination of the attribute names corresponding to the same attribute value in the attribute items, which are described according to the schemas, of the dictionary definition item from the data management unit. A dictionary generation unit generates dictionary information defining synonymity between the attribute names of the different attribute items described according to the different schemas based on the dictionary candidate retrieved by the dictionary candidate retrieval unit. A dictionary management unit stores therein the dictionary information generated by the dictionary generation unit.

12 Claims, 15 Drawing Sheets

FIG.4

```
                              CI
a-XML

<a:Server nickname="web01" ipaddr="192.168.0.1">
    <a:@cpu type="x86">2GHz</a:cpu>
    <a:hdd/>
    <a:memory/>
  </a:Server> b-XML

<b:Server name="web01" ip_address="192.168.0.1">
    <b:harddiskdrive/>
    <b:processor cputype="x86">2GHz</b:cpu>
    <b:memory/>
  <b:Server>
```

FIG.5

| IDENTITY ID | a-XML CONFIGURATION ITEM/ATTRIBUTE NAME | b-XML CONFIGURATION ITEM/ATTRIBUTE NAME |
|---|---|---|
| 001 | Server/@nickname | Server/@name |
| 002 | Server/cpu | Server/processor |
| 003 | Server/cpu/@type | Server/processor/@cputype |

CONFIGURATION INFORMATION MANAGEMENT APPARATUS AND DICTIONARY GENERATION METHOD OF CONFIGURATION INFORMATION MANAGEMENT APPARATUS

CROSS-REFERENCE TO RELATED APPLICATION

This application is based upon and claims the benefit of priority of the prior Japanese Patent Application No. 2010-050977, filed on Mar. 8, 2010, the entire contents of which are incorporated herein by reference.

FIELD

The embodiments discussed herein are directed to a configuration information management apparatus and a dictionary generation method of the configuration information management apparatus.

BACKGROUND

In recent years, multi vendors interlink and integrate different work systems and open information between different systems to exchange information. As a result, an IT system has become larger and more complex concomitantly with an increase in number of servers or an increase in capacity of storages. Therefore, problems may arise in that operation cost increases and the system stops or service quality deteriorates due to human error. In order to solve these problems, the management of information regarding the IT system configuration such as the servers, storages, and applications becomes important.

For example, operation management middleware optimized for management work such as server management, network management, service management, and asset management are necessary for an operation of a data center. Each operation management middleware includes unique database and registers configuration information regarding each work in a database. Thus, in order for the operation management middlewares to independently manage the configuration information from other databases, work for interlinking the operation management middlewares has to be carried out in practice by a human source since access methods or schemas of the configuration information are different between the operation management middlewares.

Accordingly, there is known a configuration information management including a database called a federated configuration management database (FCMDB) that virtually federates various kinds of configuration information scattered in a plurality of operation management middlewares. The FCMDB virtually federates the configuration information of the respective operation management middlewares. The operation management middleware federated by the FCMDB is called a management data repository (MDR). FIG. 16 is an explanatory diagram illustrating the structure of an FCMDB system. An FCMDB system 300 illustrated in FIG. 16 includes a plurality of MDRs 301, an FCMDB 302, and a client terminal 304. The MDRs 301 and the FCMDB 302 are connected to each other for communication via a network 303.

Each MDR 301 manages attribute items regarding configuration items such as apparatuses present in an IT system for each type of configuration items. Moreover, each MDR 301 manages not only types of configuration items of data for management and different amounts of data but also various kinds of information regarding the attribute item in association with the local ID of the own MDR. For example, an MDR 301A manages design information, an MDR 301B manages product information, an MDR 301C manages performance information, and an MDR 301D manages configuration information.

The FCMDB 302 federally manages the same target configuration information distributed and managed in the plurality of MDRs 301. Specifically, the FCMDB 302 manages configuration items (CIs) such as apparatuses, software, and data log forming an IT system. For example, the CI "C" managed by the FCMDB 302 is a federation of the configuration information of design information C'' managed by the MDR 301A, the performance information C^ managed by the MDR 301C, and the configuration information C' managed by the MDR 301D.

As a consequence, an operator such as a person in charge of system management can manage and understand the configuration of the entire IT system with reference to the virtually federated configuration information using the FCMDB 302 under various situations associated with system operations such as deployment application work or hardware maintenance.

FIG. 17 is an explanatory diagram illustrating the principle of data federation of the FCMDB system 300. In the example of FIG. 17, the MDR 301A manages "server", "ID: WebServer1", and "S/N: XYZ123" as the attribute item of the same CI. The attribute item has an attribute name and an attribute value. The attribute name corresponds to, for example, "ID" and "S/N". The attribute value corresponds to, for example, "WebServer1" and "XYZ123". Moreover, the MDR 301B manages "ID: 192.168.0.1" and "PRODUCT NUMBER: XYZ123" as the attribute item of the same CI. The attribute name corresponds to, for example, "ID" and "PRODUCT NUMBER". The attribute value corresponds to, for example, "192.168.0.1" and "XYZ123". Moreover, the MDR 301C manages "HOST", "ID: hostnameX", and "SERNO: XYZ123" as the attribute item of the same CI. The attribute name corresponds to, for example, "ID" and "SERNO". The attribute value corresponds to, for example, "hostnameX" and "XYZ123". Moreover, the MDR 301D manages "NODE", "ID: 192.168.0.1" and "SN: XYZ123" as the attribute item of the same CI. The attribute name corresponds to, for example, "ID" and "SN". The attribute value corresponds to, for example, "192.168.0.1" and "XYZ123". That is, the MDRs 301 each manage different CI types, although the CI types are the attribute items of the same CI.

The FCMDB 302 converts the attribute items of the same CI managed by the respective MDRs 301 into a common format. Moreover, the FCMDB 302 uses a common property, which has a unique attribute value different from the attribute items managed with the different local ID of each MDR 301, as a key and performs a reconciliation process to certify the attribute items of the same CI. The common property corresponds to the unique attribute value "XYZ123" such as "S/N: XYZ123", "PRODUCT NUMBER: XYZ123", "SERNO: XYZ123", and "SN: XYZ123" indicating the product number.

The FCMDB 302 certifies the attribute items of the same CI using the common property of the product number from the plurality of attribute items managed with the different local ID of each MDR 301 as the key, and federally manages the attribute items of the same CI distributed and managed by the respective MDRs 301.

When the information regarding the plurality of schemas such as an a-XML format and a b-XML format is federally managed even in the same CI, the information regarding the schemas, for example, dictionary information such as the common property matching the attribute items has to be generated in order to perform the reconciliation process.

Examples of the related art include Japanese Laid-open Patent Publication No. 2007-179146, Japanese Laid-open Patent Publication No. 2006-99236. Further example of the related art includes "CMDB Federation (CMDBf)" Committee Draft Version 1.0 [online], Oct. 22, 2007, CMDB Federation Working Group [search in Jan. 23, 2008], Internet <URL: http://cmdbf.org/schema/1-0-0/CMDBf % 20 v1.0.pdf>.

In the method of generating the dictionary information according to the related art, however, it is necessary for an operator to search for information regarding the synonymous attribute items manually and to generate the dictionary information defining the synonymity between the attribute items of the plurality of schemas. As a consequence, in the method according to the related art, the work burden on the operator is considerably large when the dictionary information of the attribute elements of the plurality of schemas is generated.

SUMMARY

According to an aspect of an embodiment of the invention, a configuration information management apparatus includes a data management unit that stores therein configuration items each having attribute items described according to different schemas; a dictionary candidate retrieval unit that specifies the attribute items of the schemas in the same configuration item for each of the configuration items stored in the data management unit based on a correspondence between the attribute items of the different schemas and retrieves, as a dictionary candidate, a combination of attribute names corresponding to the same attribute value among the attribute items of the schemas from the data management unit; a dictionary generation unit that generates dictionary information defining synonymity between the attribute names of the attribute items described according to the different schemas based on the dictionary candidate retrieved by the dictionary candidate retrieval unit; and a dictionary management unit that stores therein the dictionary information generated by the dictionary generation unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is an explanatory diagram illustrating an example of CI data being managed by a data management unit;

FIG. 5 is an explanatory diagram illustrating an example of table details of a dictionary management unit;

DESCRIPTION OF EMBODIMENTS

Preferred embodiments of the present invention will be explained with reference to accompanying drawings. The technical spirit of the invention is not limited to the details of the embodiments.

[a] First Embodiment

Figure 1:
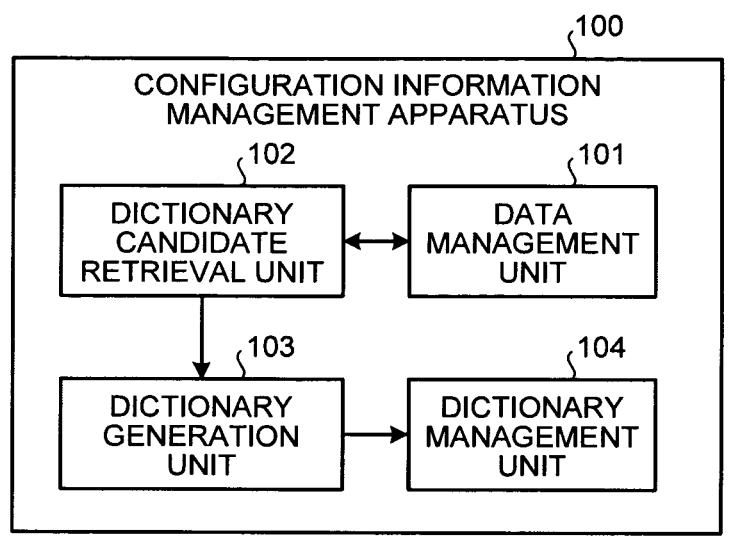
FIG. 1 is a block diagram illustrating the structure of a configuration information management apparatus according to a first embodiment.

FIG. 1 is a block diagram illustrating the structure of a configuration information management apparatus according to a first embodiment. A configuration information management apparatus 100 illustrated in FIG. 1 includes a data management unit 101, a dictionary candidate retrieval unit 102, a dictionary generation unit 103, and a dictionary management unit 104. The data management unit 101 stores therein configuration items including attribute items described according to different schemas to manage the configuration items.

The dictionary candidate retrieval unit 102 specifies the attribute items described according to the schemas for each of the configuration items stored in the data management unit 101 in the same configuration item based on the correspondence relation of the attribute items described according to the different schemas. Moreover, the dictionary candidate retrieval unit 102 retrieves, as a dictionary candidate, a combination of the attribute names, which correspond to the same attribute value, of the attribute items described according to the schemas from the data management unit 101. The correspondence relation of the attribute items corresponds to, for example, a combination of the attribute items which is a basis of generation of the dictionary candidates of the attribute items described according to the different schemas.

The dictionary generation unit 103 generates the dictionary information defining the synonymity between the attribute names of the attribute items described according to the different schemas, based on the dictionary candidate retrieved by the dictionary candidate retrieval unit 102. The dictionary management unit 104 stores therein the dictionary information generated by the dictionary generation unit 103 to manage the dictionary information.

According to the first embodiment, the combination of the attribute names, which correspond to the same attribute value, of the attribute items described according to the different schemas is retrieved as the dictionary candidate from the data management unit 101. Moreover, according to the first embodiment, the dictionary information defining the synonymity between the attribute names of the attribute items described according to the different schemas is automatically generated, and the dictionary information is stored in and managed by the dictionary management unit 104. As a consequence, in the first embodiment, high-accurate dictionary information can be provided, while considerably reducing the work burden on an operator when the dictionary information of the plurality of schemas is generated.

[b] Second Embodiment

Figure 2:
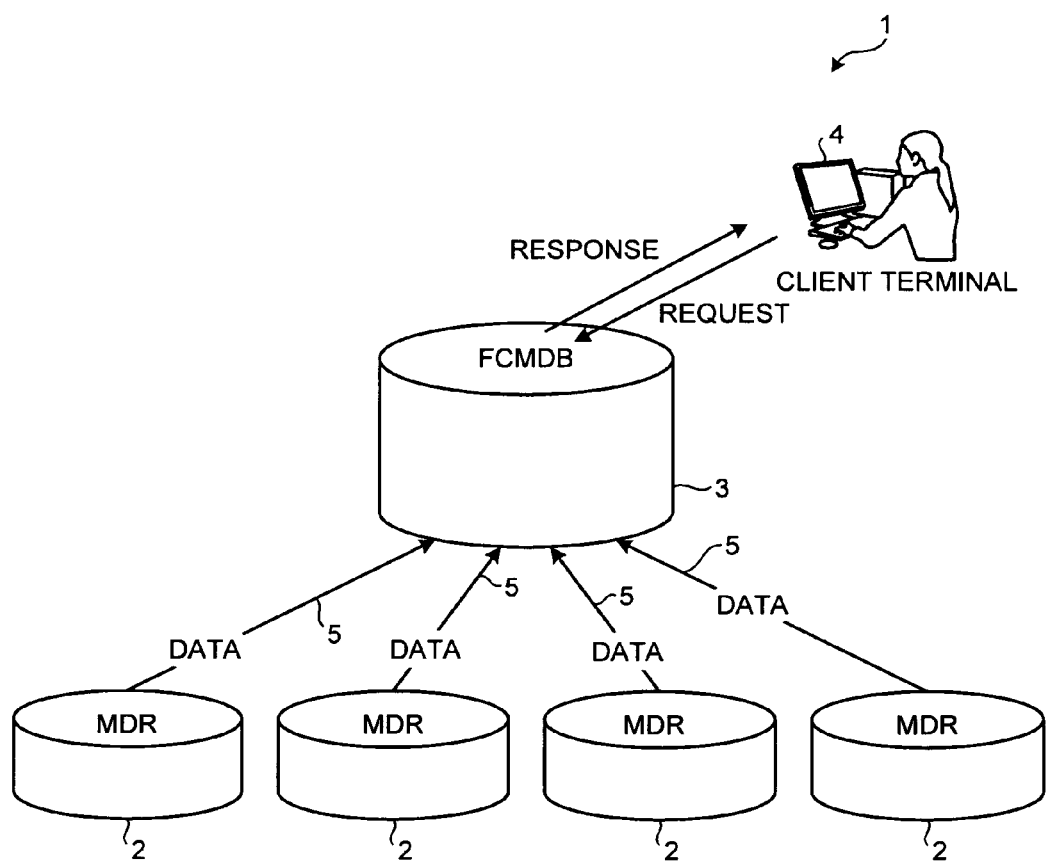
FIG. 2 is a block diagram illustrating the structure of an FCMDB system according to a second embodiment.

Next, a federated configuration management database (FCMDB) system according to the second embodiment will be described. FIG. 2 is a block diagram illustrating the structure of the FCMDB system according to the second embodiment. An FCMDB system 1 illustrated in FIG. 2 includes a plurality of management data repositories (MDR) 2, an FCMDB 3, and a client terminal 4. The MDRs 2 and the FCMDB 3 are connected to each other for communication via a network 5.

The MDR 2 manages configuration items (CIs) forming configuration information and an attribute item of each CI. The CI corresponds to an item, such as a server, a storage, or software, forming an IT system. The attribute item includes an attribute name and an attribute value. The attribute name corresponds to, for example, an IP address name, a serial number, or a domain name. The attribute value corresponds to, for example, an IP address value, a serial number value, or a domain name itself. The MDR 2 manages data such as the CIs described according to different schemas or the attribute items.

The FCMDB 3 virtually federates the data of the plurality of MDRs 2, reconciles and federates the data by a CI unit, and manages the data. When detecting a retrieval request of the configuration information of a retrieval target from the client terminal 4, the FCMDB 3 retrieves the configuration information of the retrieval target and supplies the retrieval result to the client terminal 4. The client terminal 4 displays the retrieval result on a display screen.

Figure 3:
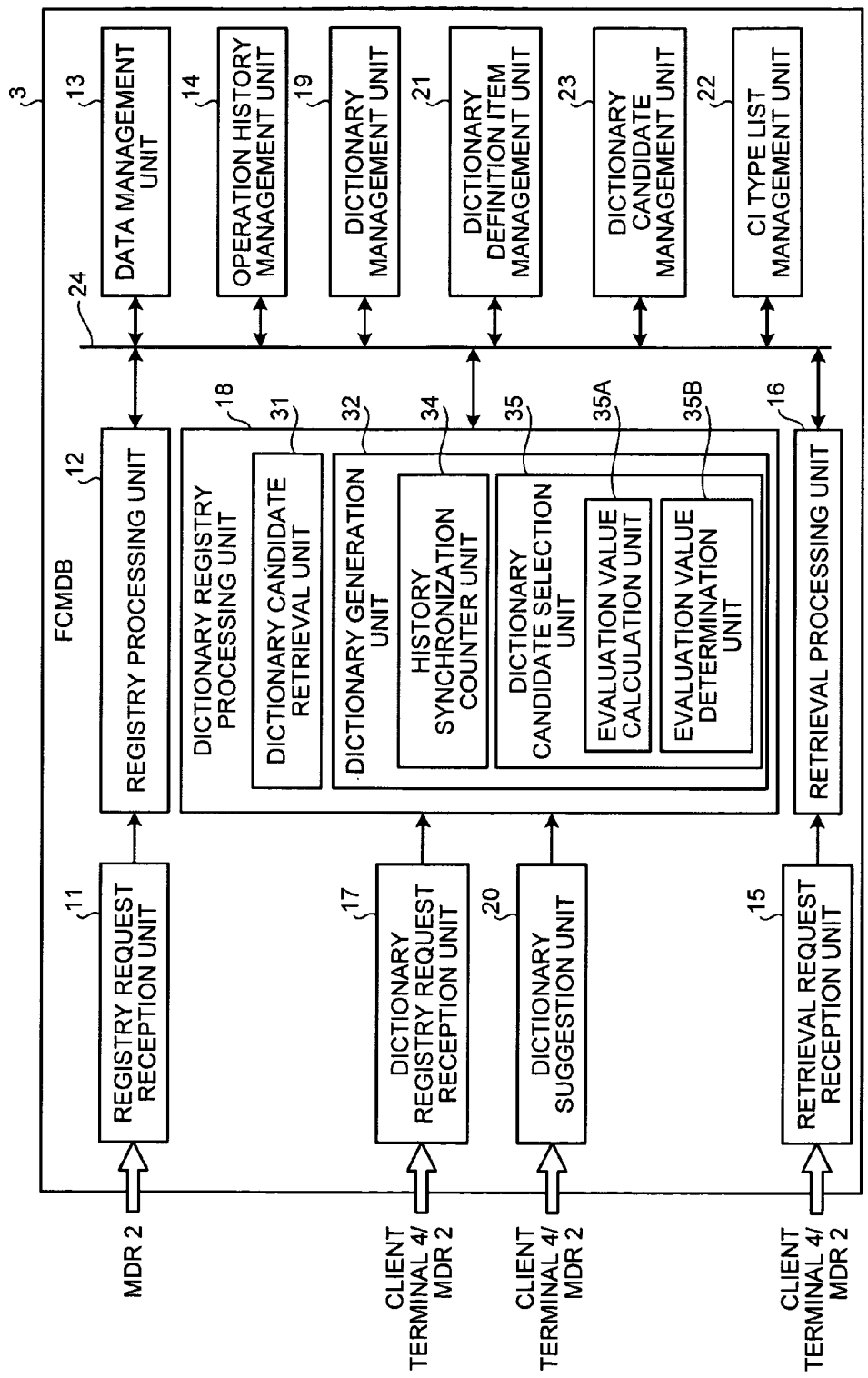
FIG. 3 is a block diagram illustrating the structure of an FCMDB.

FIG. 3 is a block diagram illustrating the structure of the FCMDB 3. The FCMDB 3 illustrated in FIG. 3 includes a registry request reception unit 11, a registry processing unit 12, a data management unit 13, an operation history management unit 14, a retrieval request reception unit 15, and a retrieval processing unit 16. The registry request reception unit 11 is connected via the network 5 and receives a data registry request from the MDR 2. When detecting the data registry request, the registry processing unit 12 registers data from the MDR 2 in the data management unit 13. The data management unit 13 virtually manages the CI and attribute item of each MDR 2.

FIG. 4 is an explanatory diagram illustrating an example of CI data being managed by the data management unit 13. The CI data illustrated in FIG. 4 includes a plurality of attribute items described according to an a-XML format and attribute items described according to a b-XML format in the same CI data. Of course, there is the CI data described according to a single XML format such as the a-XML format or the b-XML format.

The operation history management unit 14 manages an operation history of the CIs or the attribute items in the data management unit 13. The retrieval request reception unit 15 is connected via the network 5 and receives a data retrieval request from each MDR 2 or the client terminal 4. When detecting the data retrieval request, the retrieval processing unit 16 retrieves the data of a retrieval target from the data management unit 13.

The FCMDB 3 includes a dictionary registry request reception unit 17, a dictionary registry processing unit 18, a dictionary management unit 19, and a dictionary suggestion unit 20. The dictionary registry request reception unit 17 is connected via the network 5 and receives a dictionary registry request from each MDR 2 or the client terminal 4. When detecting the dictionary registry request, the dictionary registry processing unit 18 registers, for example, dictionary information input manually in the dictionary management unit 19.

The dictionary management unit 19 stores therein dictionary information defining the synonymity in such a manner that the attribute names of the attribute items described according to the a-XML format are matched with the attribute names of the attribute items described according to the b-XML format, thereby managing the dictionary information. FIG. 5 is an explanatory diagram illustrating an example of table details of the dictionary management unit 19.

The dictionary management unit 19 illustrated in FIG. 5 manages an attribute name 19B associated with the attribute item of the a-XML format and an attribute name 19C associated with the attribute item of the b-XML format for each identity ID 19A. The FCMDB 3 manages the attribute items described according to different XML formats in the same CI data in the data management unit 13. Therefore, based on the dictionary information being managed by the dictionary management unit 19, the FCMDB 3 can recognize that, for example, "Server/@nickname" of the attribute name 19B of the a-XML format is synonymous with "Sever/@name" of the attribute name 19C of the b-XML format. The dictionary suggestion unit 20 suggests the dictionary information managed by the dictionary management unit 19 on the display screen of the client terminal 4.

The FCMDB 3 includes a dictionary definition item management unit 21, a CI type list management unit 22, a dictionary candidate management unit 23, and a bus line 24. The dictionary definition item management unit 21 manages at least one dictionary definition item for each CI type. For example, the dictionary definition item corresponds to a common property (Identifying Property) of a combination between the attribute items described according to the a-XML format and the attribute items described according to the b-XML format. Moreover, the dictionary definition item is used to retrieve the dictionary candidate estimating the synonymity between the attribute names of the attribute items described according to the different XML formats. In this embodiment, for example, when the CI type is "Server", a combination between the attribute name "Server/@ipaddr" of the a-XML format and the attribute name "Server/@ip_address" of the b-XML format is set as the dictionary definition item.

Figure 6:
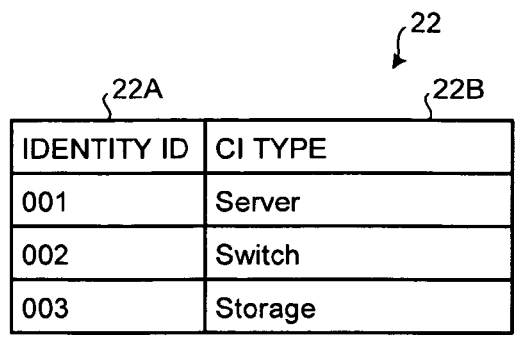
FIG. 6 is an explanatory diagram illustrating an example of the table details of a CI type list management unit.

The CI type list management unit 22 manages the CI type of the CI data being managed by the data management unit 13. FIG. 6 is an explanatory diagram illustrating an example of the table details of the CI type list management unit 22. The CI type list management unit 22 illustrated in FIG. 6 manages the CI type 22B such as "Server", "Switch" and "Storage" for each identity ID 22A.

Figure 7:
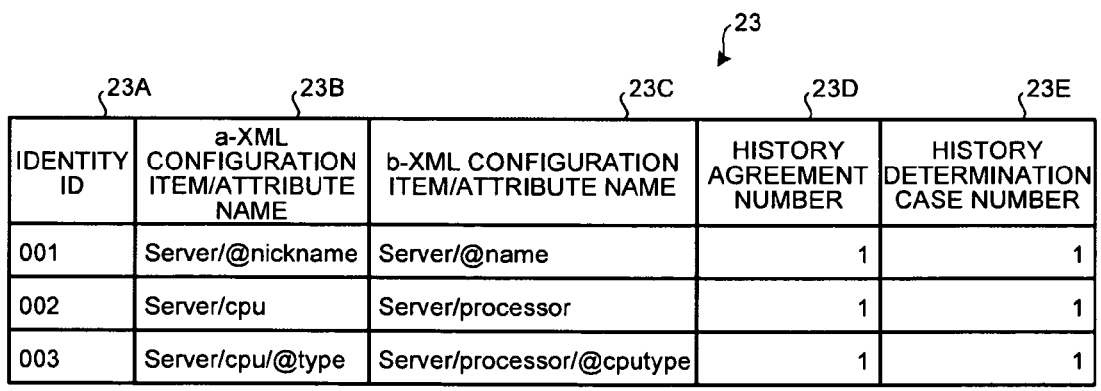
FIG. 7 is an explanatory diagram illustrating an example of the table details of a dictionary candidate management unit.

The dictionary candidate management unit 23 stores therein a dictionary candidate serving as a basis used when the dictionary information is generated, to manage the dictionary candidate. FIG. 7 is an explanatory diagram illustrating an example of the table details of the dictionary candidate management unit 23. The dictionary candidate management unit 23 illustrated in FIG. 7 manages the attribute name 23B of the attribute item described according to the a-XML format, the attribute name 23C of the attribute item described according to the b-XML format, a history agreement number 23D, and a history determination case number 23E for each identity ID 23A. The dictionary candidate corresponds to the combination of the attribute name of the attribute item described according to the a-XML format and the attribute name of the attribute item described according to the b-XML format which correspond to the same attribute value in the same CI data, and is the combination of the attribute names in which the synonymity is estimated between the attribute names. The history agreement number 23D indicates the number of times by which the data are synchronized for the operation history between the attribute items in the dictionary candidate. The history determination case number 23E indicates the number of pieces of data that it is determined whether each piece of data is synchronized in the operation history between the attribute items in the dictionary candidate.

The bus line 24 forms data transmission lines among the registry processing unit 12, the data management unit 13, the operation history management unit 14, the retrieval processing unit 16, the dictionary registry processing unit 18, the dictionary management unit 19, the dictionary definition item management unit 21, the dictionary candidate management unit 23, and the CI type list management unit 22.

Figure 8:
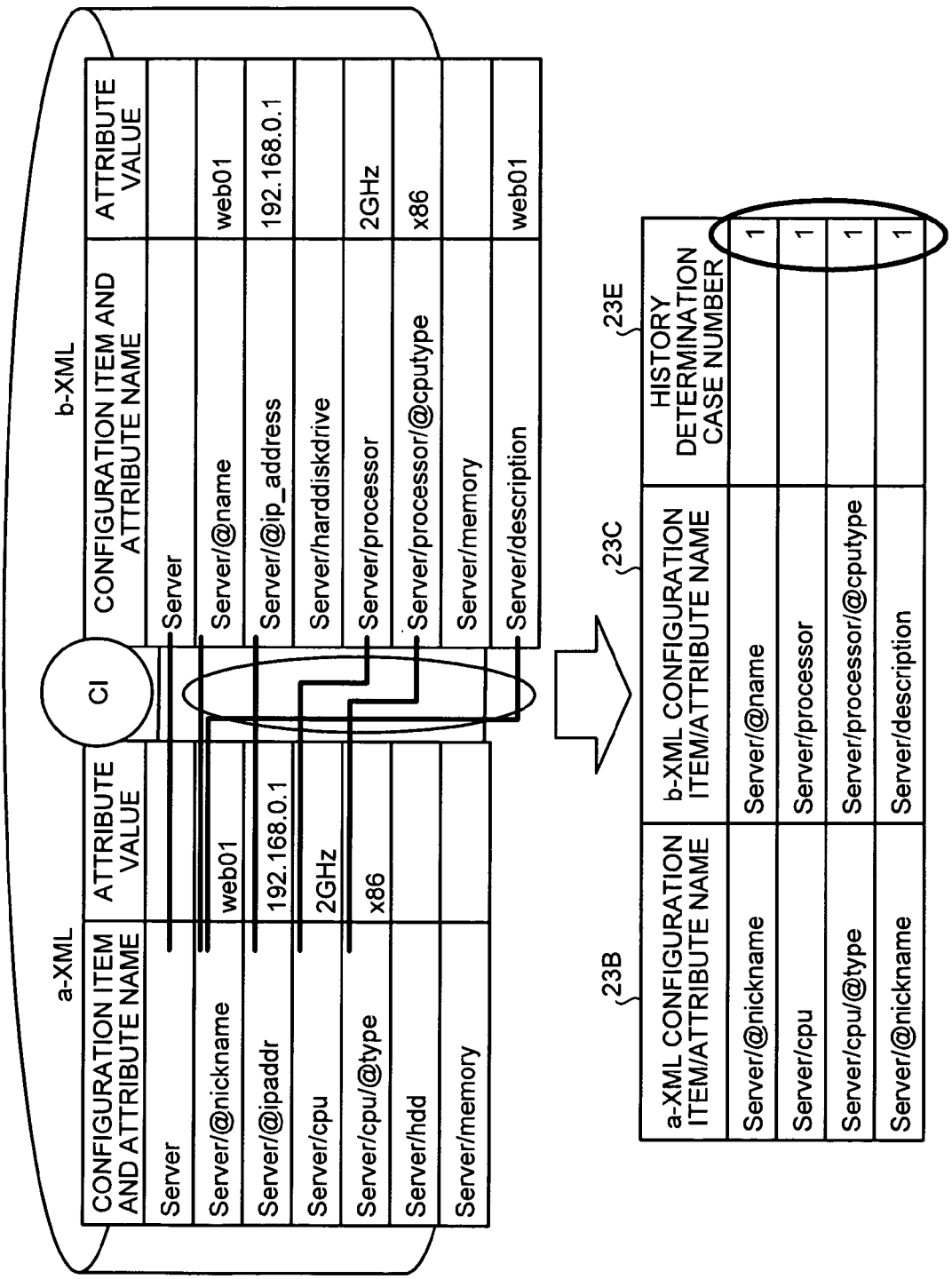
FIG. 8 is an explanatory diagram illustrating an example of an operation of a dictionary candidate retrieval unit.

The dictionary registry processing unit 18 includes a dictionary candidate retrieval unit 31 and a dictionary generation unit 32. The dictionary candidate retrieval unit 31 retrieves, as the dictionary candidate, the combination of the attribute names corresponding to the same attribute value in the attribute items described according to the different XML formats of the dictionary definition items managed by the dictionary definition item management unit 21, from the data management unit 13. FIG. 8 is an explanatory diagram illustrating an example of an operation of the dictionary candidate retrieval unit 31. The dictionary definition item corresponds to a combination of the attribute name "Server/@ipaddr" of the a-XML format and the attribute name "Server/@ip_address" of the b-XML format.

The dictionary candidate retrieval unit 31 specifies the attribute item of the a-XML format and the attribute item of the b-XML format using the dictionary definition item, when the attribute items of the same CI data being managed by the data management unit 13 are described according to the a-XML format and the b-XML format. Moreover, the dictionary candidate retrieval unit 31 retrieves the combination of the attribute names corresponding to the same attribute value between the attribute item of the a-XML format and the attribute item of the b-XML format. For example, as illustrated in FIG. 8, the dictionary candidate retrieval unit 31 retrieves the attribute names "Server/@nickname" and "Server/@name" of the attribute value "web01," and retrieves the attribute names "Server/cpu" and "Server/processor" of the attribute value "2 GHz." Moreover, the dictionary candidate retrieval unit 31 retrieves the attribute names "Server/cpu/@type" and "Server/processor/@cputype" of the attribute value "x86," and retrieves the attribute names "Server/@nickname" and "Server/description" of the attribute value "web01."

The dictionary candidate retrieval unit 31 acquires source information of each attribute item from the MDR 2, when retrieving the combination of the attribute names of the attribute items corresponding to the same attribute value. For example, the source information corresponds to the identity information of the MDR 2, a delivery method which is a delivery source of this attribute item. The dictionary candidate retrieval unit 31 sets the combination of the attribute names of the attribute items as the dictionary candidate, when the source information of each attribute item satisfies the same condition. The dictionary candidate retrieval unit 31 sequentially retrieves the dictionary candidates from the data management unit 13, and sequentially registers the sequentially retrieved dictionary candidates to the dictionary candidate management unit 23. That is, the dictionary candidate retrieval unit 31 sequentially registers the dictionary candidates for all of the CI data in the FCMDB 3 to the dictionary candidate management unit 23, by sequentially retrieving the dictionary candidates for each one piece of the CI data and sequentially registering the sequentially retrieved dictionary candidates to the dictionary candidate management unit 23.

Figure 9:
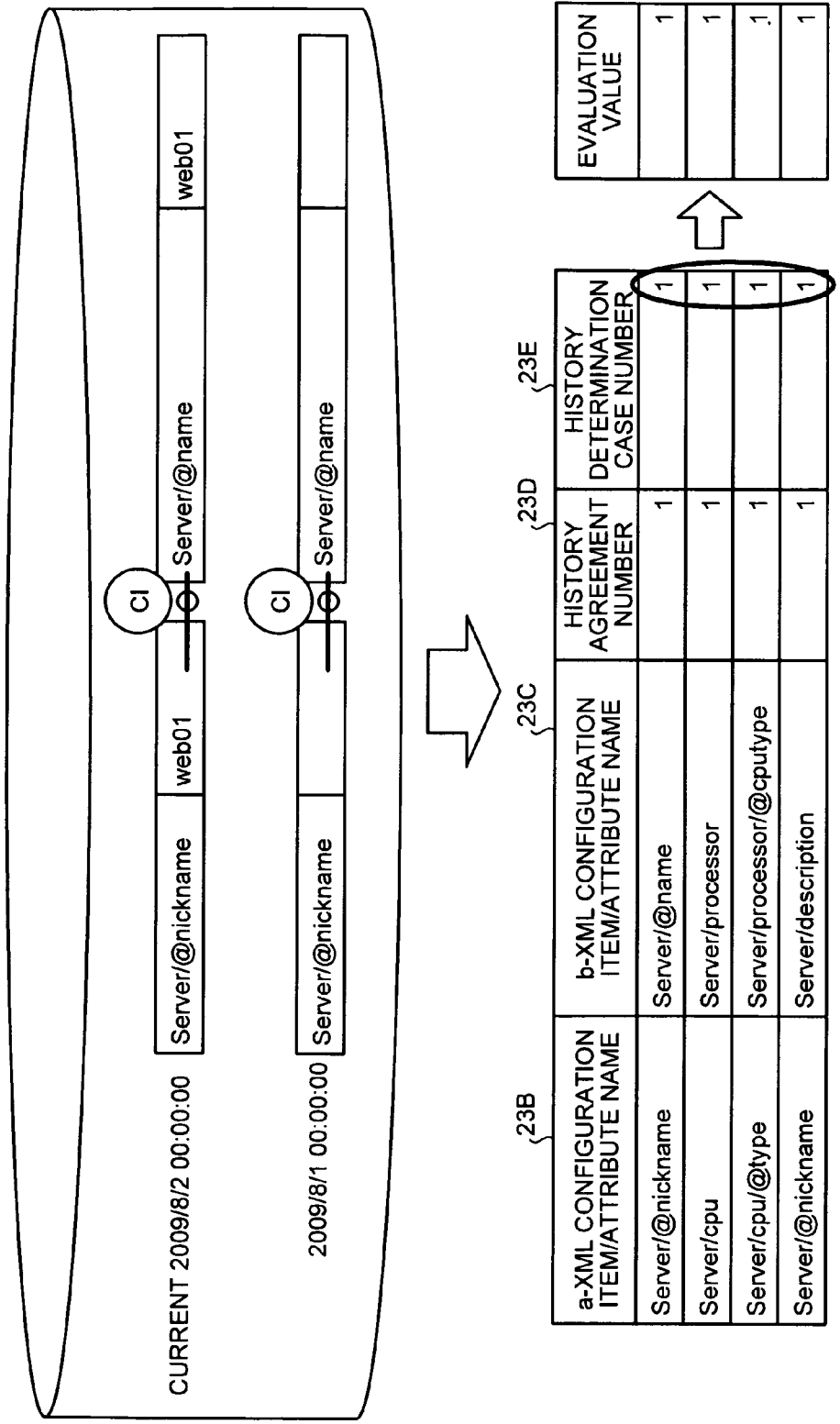
FIG. 9 is an explanatory diagram illustrating an example of an operation of a history synchronization counter unit.

The dictionary generation unit 32 includes a history synchronization counter unit 34 and a dictionary candidate selection unit 35. When the dictionary candidate retrieval unit 13 retrieves the dictionary candidate, the history synchronization counter unit 34 acquires the operation history of the attribute items in the dictionary candidates from the operation history management unit 14. Moreover, the history synchronization counter unit 34 compares the operation histories of the attribute items of the dictionary candidate and determines whether the data are synchronized in the operation history. FIG. 9 is an explanatory diagram illustrating an example of the operation of the history synchronization counter unit 34. For facilitating the description, for example, the operation history corresponds to a day ago from the current day.

When the dictionary candidate of "Server/@nickname" and "Server/@name" is retrieved, the history synchronization counter unit 34 acquires the operation history of "Server/@nickname" and the operation history of "Server/@name" a day ago from the current day from the operation history management unit 14. The history synchronization counter unit 34 compares the operation history of "Server/@nickname" and the operation history of "Server/@name" a day ago from the current day, and determines whether the data are synchronized.

Figure 10:
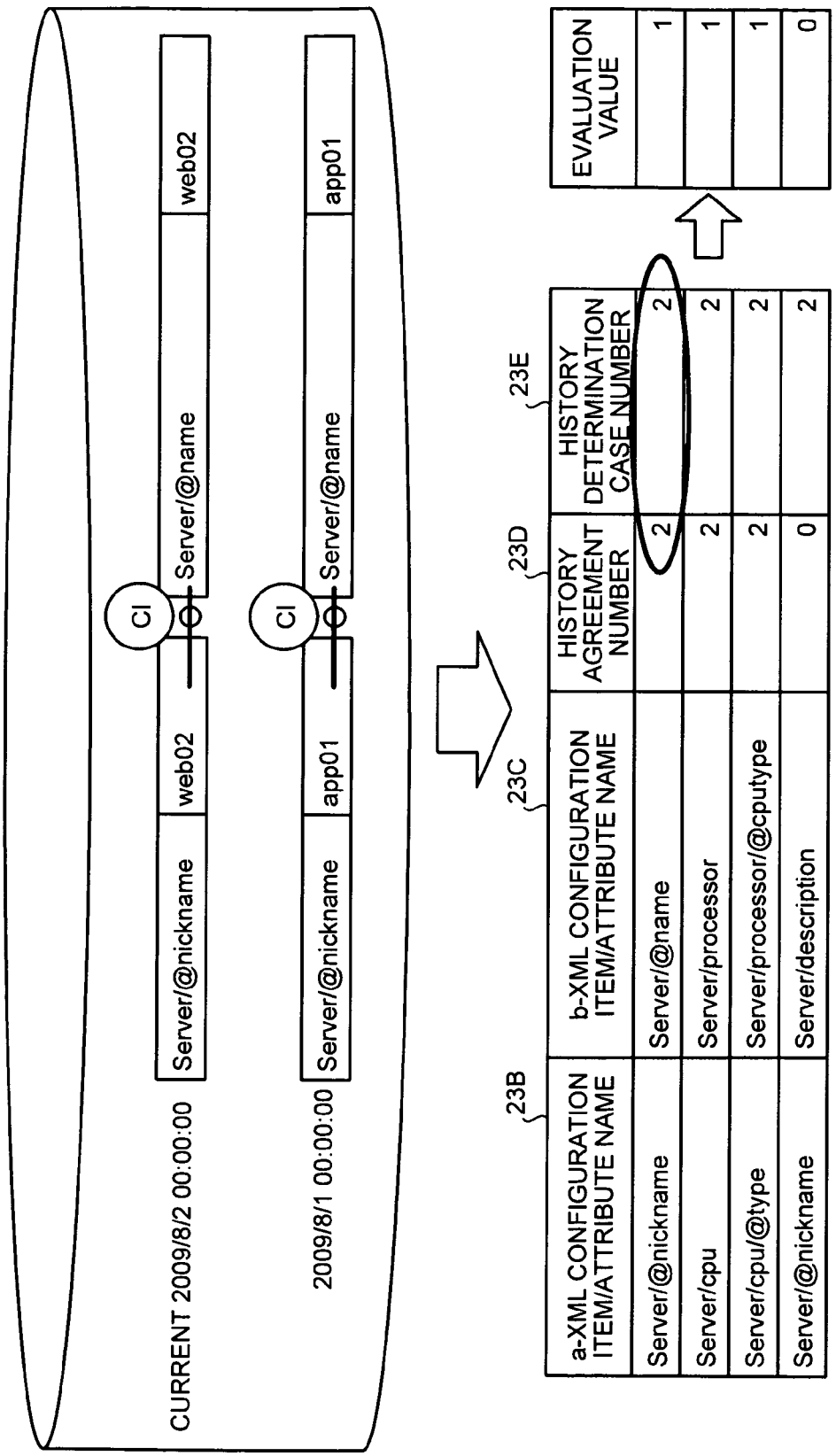
FIG. 10 is an explanatory diagram illustrating an example of an operation of the history synchronization counter unit.

At this time, when the history synchronization counter unit 34 determines whether the data of the operation history are synchronized, the history synchronization counter unit 34 increments the history determination case number corresponding to the dictionary candidate by one and updates the history determination case number corresponding to the dictionary candidate in the dictionary candidate management unit 23. The history synchronization counter unit 34 determines that the data are synchronized, since the operation histories of "Server/@nickname" and "Server/@name a day ago are empty data. When the history synchronization counter unit 34 determines that the data are synchronized, the history synchronization counter unit 34 increments the history agreement number corresponding to the dictionary candidate by one and updates the history agreement number corresponding to the dictionary candidate in the dictionary candidate management unit 23. The history synchronization counter unit 34 sequentially determines whether the data associated with the operation history of the attribute items in the dictionary candidate for each one piece of the CI data are synchronized, and sequentially updates the history agreement number and the history determination case number corresponding to the dictionary candidate in the dictionary candidate management unit 23. FIG. 10 is an explanatory diagram illustrating an example of an operation of the history synchronization counter unit.

That is, as illustrated in FIG. 10, the history synchronization counter unit 34 increments the history determination case number by one and updates the history determination case number to "2" in order to determine the operation histories of "Server/@nickname" and "Server/@name" of the subsequent CI data a day ago. Moreover, since the attribute value "app01" of the operation history of "Server/@nickname" and "Server/@name" is the same, the history synchronization counter unit 34 determines the data are synchronized, increments the history agreement number by one, and updates the history agreement number to "2".

Figure 11:
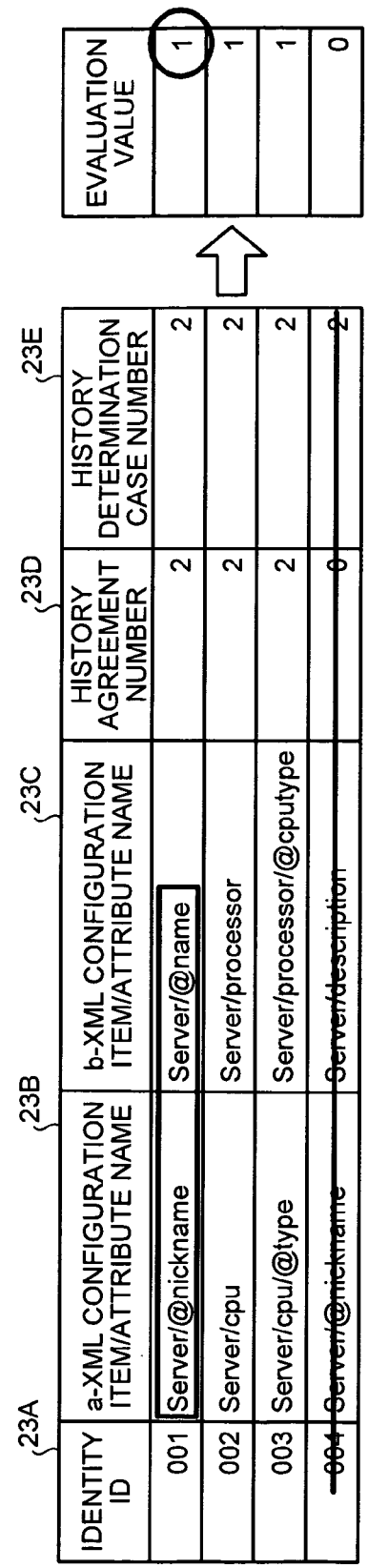
FIG. 11 is an explanatory diagram illustrating an example of an operation of a dictionary candidate selection unit.

The dictionary candidate selection unit 35 includes an evaluation value calculation unit 35A and an evaluation value determination unit 35B. The evaluation value calculation unit 35A calculates an evaluation value of each dictionary candidate in an expression (history agreement number÷history determination case number) based on the history agreement case number and the history determination case number of each dictionary candidate being managed by the dictionary candidate management unit 23. FIG. 11 is an explanatory diagram illustrating an example of the dictionary candidate selection unit 35.

When the history agreement number and the history determination case number of the dictionary candidate of all CI data in the FCMDB 3 are completely updated, the evaluation value determination unit 35B extracts the dictionary candidate with the highest evaluation value among the dictionary candidates being managed by the dictionary candidate management unit 23. Moreover, when the evaluation value determination unit 35B extracts the dictionary candidate with the highest evaluation value, the evaluation value determination unit 35B determines whether the evaluation value of the dictionary candidate is equal to or greater than a predetermined threshold value such as 0.5. When the evaluation value determination unit 35B determines that the evaluation value of the dictionary candidate is equal to or greater than the predetermined threshold value, the dictionary candidate selection unit 35 selects the corresponding dictionary candidate as the dictionary candidate of a dictionary target. Then, the dictionary generation unit 32 generates the dictionary information based on the dictionary candidate selected by the dictionary candidate selection unit 35, and registers the generated dictionary information in the dictionary management unit 19.

When the dictionary candidate selection unit 35 selects the dictionary candidate of the dictionary target, the dictionary candidate selection unit 35 deletes the dictionary candidate including the attribute items of the corresponding dictionary candidate from the dictionary candidate management unit 23. As illustrated in FIG. 11, the dictionary candidate selection unit 35 selects "Server/@nickname" and "Server/@name" as the dictionary candidate of the dictionary target. Therefore, the dictionary candidate selection unit 35 deletes the dictionary candidates "server/@nickname" and "Server/description" including "Server/@nickname" from the dictionary candidate management unit 23.

Figure 12:
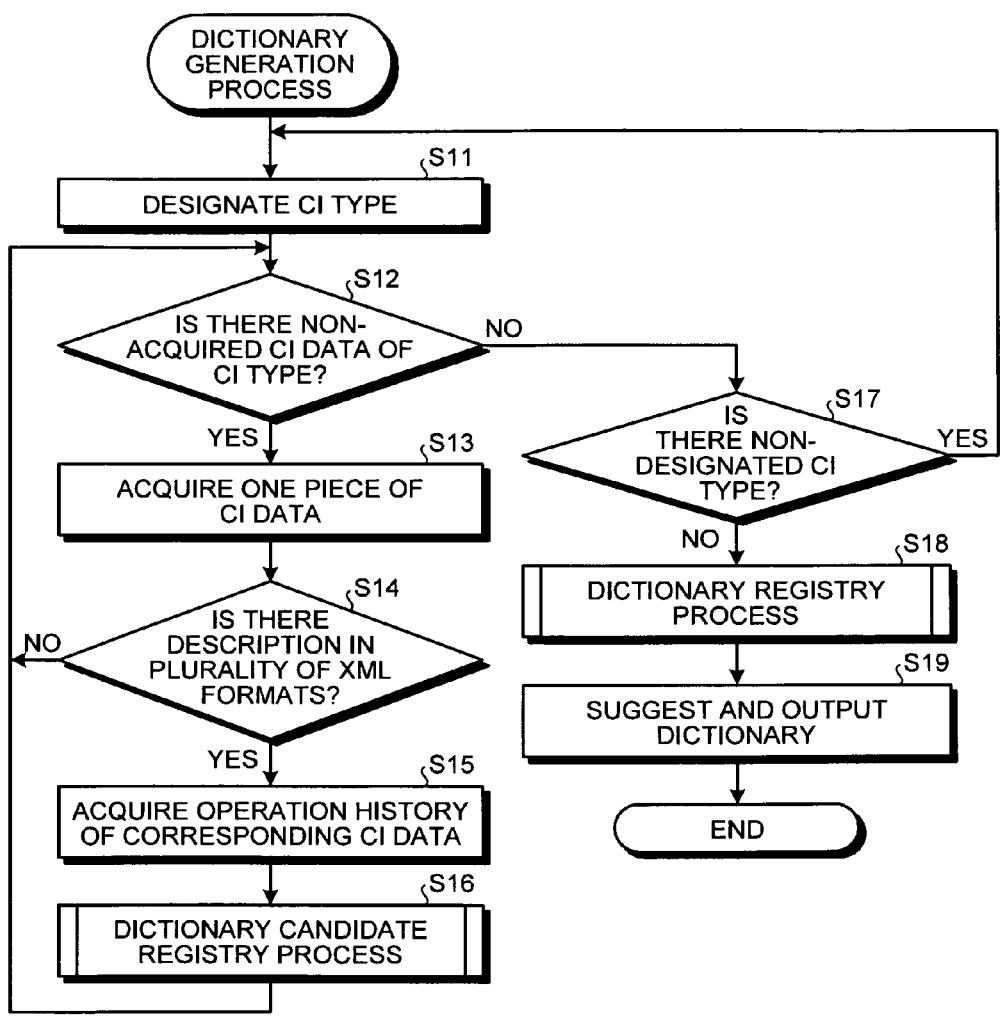
FIG. 12 is a flowchart illustrating a processing operation of the dictionary registry processing unit which is associated with a dictionary generation process.

Next, an operation of the FCMDB system 1 according to the second embodiment will be described. FIG. 12 is a flowchart illustrating a processing operation of the dictionary registry processing unit 18 which is associated with a dictionary generation process. The dictionary generation process illustrated in FIG. 12 is a process of generating the dictionary information defining the synonymity between the attribute names of the attribute items described according to the a-XML format and the b-XML format in the same CI being managed by the data management unit 13 and registering the generated dictionary information in the dictionary management unit 19.

The dictionary registry processing unit 18 in FIG. 12 designates one CI type from the CI type list management unit 22 (step S11). When the dictionary registry processing unit 18 designates the CI type, the dictionary registry processing unit 18 determines whether there is the non-acquired CI data of the CI type in the data management unit 13 (step S12). When there is the non-acquired CI data of the CI type (Yes in step S12), the dictionary registry processing unit 18 acquires the CI data corresponding to one piece of non-acquired CI data from the data management unit 13 (step S13). When the dictionary registry processing unit 18 acquires the CI data corresponding to one piece of non-acquired CI data, the dictionary registry processing unit 18 determines whether there is a description of a plurality of XML formats in the CI data (step S14).

When there is a description of the plurality of XML formats in the CI data (Yes in step S14), the dictionary registry processing unit 18 acquires the operation history of the same CI data from the operation history management unit 14 (step S15). The operation history corresponds to a predetermined time such as a day ago from the current day. Moreover, when the operation history of the same CI data is acquired, the dictionary generation unit 32 performs a dictionary candidate registry process, which is described below with reference to FIG. 13, corresponding to one piece of the CI data (step S16).

After the dictionary registry processing unit 18 performs the dictionary candidate registry process, the process proceeds to step S12 in order to determine whether there is the non-acquired CI data of the CI type in the data management unit 13. When there is no non-acquired CI data of the CI type (No in step S12), the dictionary registry processing unit 18 determines whether there is a non-designated CI type in the CI type list management unit 22 (step S17).

When there is the non-designated CI type (No in step S17), the dictionary registry processing unit 18 allows the process to proceed to step S11 to designate the non-designated CI type. On the other hand, when there is no non-designated CI type (No in step S17), the dictionary registry processing unit 18 performs a dictionary registry process described below with reference FIG. 14 (step S18). After the dictionary registry process, the dictionary suggestion unit 20 suggests and outputs the generated dictionary information on the display screen of the client terminal 4 (step S19) and the processing operation illustrated in FIG. 12 ends. The operator can recognize the details of the dictionary information, when the operator views the details on the display screen.

When there is no description of a plurality of XML formats in the CI data (No in step S14), the dictionary registry processing unit 18 allows the process to proceed to step S12 in order to determine whether there is the subsequent non-acquired CI type.

In the dictionary generation process illustrated in FIG. 12, each one piece of the CI data of CI type in the FCMDB 3 is acquired, and the dictionary candidate registry process of registering the dictionary candidate in each CI data is performed. As a consequence, the operator can automatically acquire the dictionary candidate of all the CI data of all CI types in the FCMDB 3.

In the dictionary generation process, when the registry of the dictionary candidates of all the CI data of all the CI types is completed, the dictionary registry process of selecting and registering the dictionary information based on these dictionary candidates is performed. As a consequence, the operator can automatically acquire the dictionary candidate of all the CI data of all CI types in the FCMDB 3.

In the dictionary generation process, the dictionary information is displayed on the display screen of the client terminal 4. As a consequence, the operator can recognize the dictionary information in the FCMDB 3 on the display screen.

Figure 13:
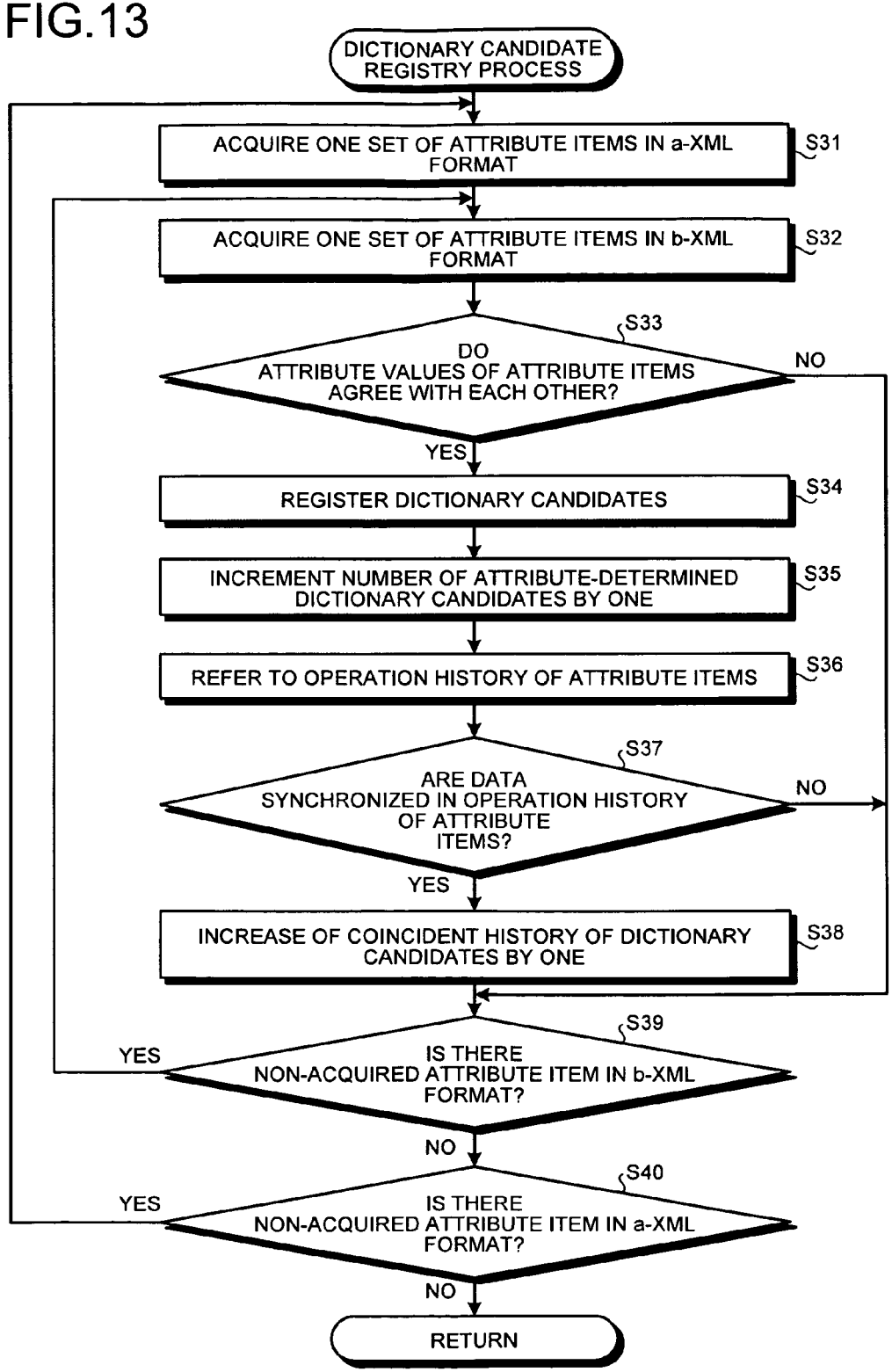
FIG. 13 is a flowchart illustrating a processing operation of the dictionary registry processing unit which is associated with a dictionary candidate registry process.

Next, the dictionary candidate registry process in step S16 of FIG. 12 will be described. FIG. 13 is a flowchart illustrating processing operation of the dictionary registry processing unit 18 which is associated with the dictionary candidate registry process. The dictionary candidate registry process illustrated in FIG. 13 is a process of retrieving the dictionary candidates in which the attribute names described according to the a-XML format and the b-XML format are synonymous with each other from the plurality of attribute items corresponding to one piece of the CI data, and registering and updating the history agreement number and the history determination case number corresponding to the dictionary candidates in the dictionary candidate management unit 23.

The dictionary candidate retrieval unit 31 of the dictionary registry processing unit 18 in FIG. 13 acquires one set of attribute items of the a-XML format as the comparison target (step S31), and then acquires one set of attribute items of the b-XML format (step S32). Then, the dictionary candidate retrieval unit 31 determines whether the attribute value of the attribute items of the a-XML format acquired in step S31 and the attribute value of the attribute items of the b-XML format acquired in step S32 agree with each other (step S33). Then, the dictionary candidate retrieval unit 31 acquires the source information of the attribute items described according to the a-XML format and the attribute items described according to the b-XML format from each MDR 2. When the source information of the respective attribute items satisfies the same condition using a comparison function, the dictionary candidate retrieval unit 31 determines whether the attribute values of the attribute items are same as each other using the comparison function.

When the attribute value of the attribute items of the a-XML format and the attribute value of the attribute items of the b-XML format agree with each other (Yes in step S33), the dictionary candidate retrieval unit 31 registers the combination of the attribute names of these attribute items as the dictionary candidate in the dictionary candidate management unit 23 (step S34).

When the dictionary candidate is registered in the dictionary candidate management unit 23, the dictionary generation unit 32 of the dictionary registry processing unit 18 increments the history determination case number in the dictionary candidate management unit 23 corresponding to the dictionary candidate by one (step S35). Then, the history synchronization counter unit 34 of the dictionary generation unit 32 refers to the operation history at the same timing associated with the respective attribute items of the dictionary candidates acquired in step S15 of FIG. 12, for example, the operation history a day ago (step S36).

The history synchronization counter unit 34 compares the operation histories a day ago between the attribute items of the comparison target dictionary candidates, and determines whether the data are synchronized in the operation histories of the attribute items using the comparison function (step S37). When the data are synchronized in the operation histories of the attribute items of the dictionary candidates (Yes in step S37), the history synchronization counter unit 34 increments the history agreement number corresponding to the dictionary candidates in the dictionary candidate management unit 23 by one (step S38). Then, when the history agreement number corresponding to the dictionary candidates is incremented by one, the dictionary candidate retrieval unit 31 determines whether there is the non-acquired attribute item described according to the b-XML format in the data management unit 13 (step S39).

When there is the non-acquired attribute item described according to the b-XML format (Yes in step S39), the dictionary candidate retrieval unit 31 allows the process to proceed to step S32 in order to acquire the subsequent attribute item described according to the b-XML format. That is, the dictionary candidate retrieval unit 31 sequentially compares one set of attribute items of the a-XML format as the comparison target with one set of attribute items of the b-XML format.

Then, there is no non-acquired attribute item described according to the b-XML format (No in step S39), the dictionary candidate retrieval unit 31 determines whether there is the non-acquired comparison target attribute item described according to the a-XML format (step S40).

When there is the non-acquired comparison target attribute item described according to the a-XML format (Yes in step S40), the dictionary candidate retrieval unit 31 allows the process to proceed to step S31 in order to acquire the subsequent comparison target attribute item described according to the a-XML format. When there is no non-acquired comparison target attribute item described according to the a-XML format (No in step S40), the dictionary candidate retrieval unit 31 determines that the process of retrieving the dictionary candidates for all of the attribute items corresponding to one piece of the CI data ends, and determinates the processing operation illustrated in FIG. 13. When the data are not synchronized in the operation histories of the attribute items (No in step S37), the history synchronization counter unit 34 allows the process to proceed to step S39 in order to determine whether there is the non-acquired attribute item described according to the b-XML format. When the attribute value of the attribute items of the a-XML format and the attribute value of the attribute items of the b-XML format do not agree with each other (No in step S33), the dictionary candidate retrieval unit 31 allows the process to proceed to step S39.

In the dictionary candidate registry process illustrated in FIG. 13, the dictionary candidates estimated that the attribute items described according to the a-XML format are synonymous with the attribute items described according to the b-XML format for all of the attribute items corresponding to one piece of the CI data are retrieved, and the history agreement number and the history determination case number of the dictionary candidates are registered in the dictionary candidate management unit 23. As a consequence, the operator can automatically register the dictionary candidate corresponding to one piece of the CI data, the history agreement number, and the history determination case number in the dictionary candidate management unit 23.

Figure 14:
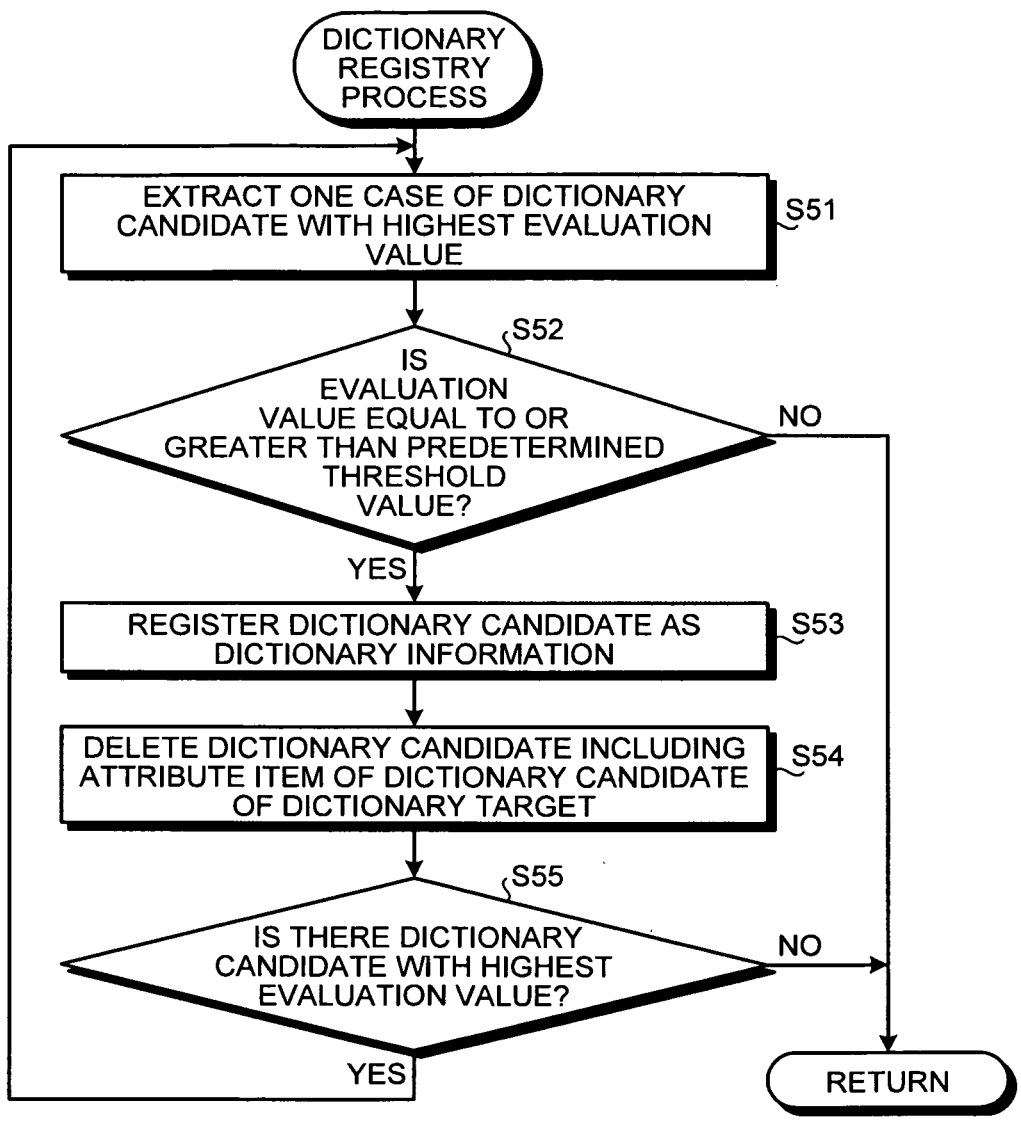
FIG. 14 is a flowchart illustrating a processing operation of the dictionary candidate selection unit which is associated with a dictionary registry process.

Next, the dictionary registry process in step S18 of FIG. 12 will be described. FIG. 14 is a flowchart illustrating the processing operation of the dictionary candidate selection unit 35 which is associated with the dictionary registry process. The dictionary registry process illustrated in FIG. 14 is a process of selecting the dictionary candidates of the dictionary target satisfying the predetermined condition from all of the dictionary candidates being registered in the dictionary candidate management unit 23 and registering the selected dictionary candidates as the dictionary information in the dictionary management unit 19.

The evaluation value calculation unit 35A of the dictionary candidate selection unit 35 extracts the history agreement number and the history determination case number for each of the dictionary candidates being managed by the dictionary candidate management unit 23, and sequentially calculates the evaluation value of each dictionary candidate based on the expression (history agreement number÷history determination case number).

The evaluation value determination unit 35B of the dictionary candidate selection unit 35 in FIG. 14 extracts the dictionary candidate with the highest evaluation value among the plurality of dictionary candidates being managed by the dictionary candidate management unit 23 (step S51). The evaluation value determination unit 35B determines whether the evaluation value of the dictionary candidate with the highest evaluation value is equal to or greater than the predetermined threshold value such as 0.5 (step S52). When the evaluation value of the dictionary candidate is equal to or greater than the predetermined threshold value (Yes in step S52), the evaluation value determination unit 35B selects this dictionary candidate as the dictionary candidate of the dictionary target and registers this dictionary candidate as the dictionary information in the dictionary management unit 19 (step S53).

When the dictionary candidate of the dictionary target is selected, as illustrated in FIG. 11, the dictionary candidate selection unit 35 deletes the dictionary candidate including the attribute item of the corresponding dictionary candidate from the dictionary candidate management unit 23 (step S54). Then, the dictionary candidate selection unit 35 excludes the dictionary candidate selected as the dictionary candidate of the dictionary target and determines whether there is the dictionary candidate with the highest evaluation value in the dictionary candidate management unit 23 (step S55).

When there is the dictionary candidate with the highest evaluation value in the dictionary candidate management unit 23 (Yes in step S55), the dictionary candidate selection unit 35 allows the process to proceed to step S51 in order to extract the dictionary candidate with the highest evaluation value. On the other hand, when there is no dictionary candidate with the highest evaluation value in the dictionary candidate management unit 23 (No in step S55), the dictionary candidate selection unit 35 terminates the processing operation illustrated in FIG. 14. When the evaluation value of the dictionary candidate with the highest evaluation value is not equal to or greater than the predetermined threshold value (No in step S52), the dictionary candidate selection unit 35 terminates the processing operation illustrated in FIG. 14 without performing the process of comparing and determining the evaluation values of the remaining dictionary candidates to each other.

In the dictionary registry process illustrated in FIG. 14, the dictionary candidate with the highest evaluation value is extracted among the dictionary candidates being managed by the dictionary candidate management unit 23. When the evaluation value of the extracted dictionary candidate is equal to or greater than the predetermined threshold value, the dictionary candidates are sequentially registered as the dictionary information in the dictionary management unit 19. As a consequence, the operator can generate the dictionary information defining the synonymity of the attribute items described according to the a-XML format and the b-XML format from the plurality of dictionary candidates, and can registers the generated dictionary information in the dictionary management unit 19.

In the dictionary registry process, the evaluation value is calculated based on the history agreement number and the history determination case number of the dictionary candidates, and the dictionary information is selected using the evaluation value from the dictionary candidates, when the dictionary information is selected from the dictionary candidates being managed by the dictionary candidate management unit 23. As a consequence, the operator can registers the dictionary information in the dictionary management unit 19 with high accuracy.

In the second embodiment, the combination of the attribute names corresponding to the same attribute value in the attribute items of the a-XML format and the attribute item of the b-XML format of the dictionary definition item is sequentially retrieved as the dictionary candidate. In the second embodiment, the dictionary information defining the synonymity between the attribute items of the a-XML format and the attribute items of the b-XML format based on the sequentially retrieved dictionary candidates is registered in the dictionary management unit 19. As a consequence, since the dictionary information in the same CI data can be automatically generated using one dictionary definition item, the work burden on the operator can be considerably reduced when generating the dictionary information. Moreover, in the second embodiment, even when the attribute items described according to the plurality of schemas are virtually managed on the FCMDB 3, the attribute items described according to the plurality of schemas can be reconciled using the dictionary information defining the synonymity between the attribute items described according to the plurality of schemas.

In the second embodiment, since the dictionary information generated by the dictionary generation unit 32 is suggested on the display screen of the client terminal 4, the operator can recognize the generated dictionary information on the display screen.

In the second embodiment, the operation histories at the same timing of the respective attribute items in the dictionary candidates are acquired for each dictionary candidate being managed by the dictionary candidate management unit 23, the operation histories of the attribute items are compared to each other, and it is determined whether the data are synchronized. In the second embodiment, since the evaluation value for selecting the dictionary candidate of the dictionary target is calculated based on the history agreement number and the history determination case number of the dictionary candidate management unit 23, the high-accurate dictionary information to which the previous history is added can be generated automatically.

In the second embodiment, when the combination of the attribute names of the attribute items according to the same attribute value is retrieved through the dictionary candidate retrieval unit 31, the source information of the attribute items is acquired from the MDR 2. When the source information satisfies the same condition, the combination of the attribute names of the attribute items is set as the dictionary candidate. As a consequence, the high-accurate dictionary candidate can automatically be retrieved by adding the source information.

In the second embodiment, the dictionary candidate with the highest evaluation value is extracted from the dictionary candidate management unit 23. When the evaluation value of the extracted dictionary candidate is equal to or greater than the predetermined threshold value, this dictionary candidate is selected as the dictionary candidate of the dictionary target and the selected dictionary candidate is registered as the dictionary information in the dictionary management unit 19. As a consequence, the high-accurate dictionary information to which the previous history is added can be generated quickly.

In the second embodiment, when the dictionary candidate of the dictionary target is selected, the dictionary candidate including the attribute item of the dictionary candidate of the dictionary target is deleted from the dictionary candidate management unit 23. As a consequence, in the second embodiment, it is possible to reliably prevent the duplicate generation of the dictionary information, while accurately selecting the dictionary candidate and making the processing speed of the selection of the dictionary candidate faster.

In the second embodiment, when the operation histories of the attribute items of the dictionary candidates are compared to each other, the operation histories a day ago are used to compare the operation histories. The invention is not limited to a day ago, but the setting number of times of the operation history can be set to be plural number such as two days ago or three days ago. As a consequence, since the high-accurate evaluation value to which the previous history is added is calculated by increasing the comparison number of times of the operation history, the higher-accurate dictionary information can be provided.

In the second embodiment, the operation histories a day ago are uniformly compared to each other irrespective of the types of attribute values of the attribute items when the operation histories of the attribute items of the dictionary candidates are compared to each other. However, the setting number of times or the setting time of the operation history may be changed according to the types of the attribute values of the attribute items to compare the operation histories. For example, when the attribute item is a CPU, the hierarchy pattern of the types of attribute values becomes complicated. Therefore, not only the operation histories may be compared to each other a day ago once, but also the operation histories may be compared to each other a day ago eight times at an interval of three hours.

In the second embodiment, when the dictionary information is registered in the dictionary management unit 19, the dictionary information is suggested on the display screen of the client terminal 4. However, the dictionary candidates, the history agreement number, and the history determination case number may be suggested on the display screen in the step of the dictionary candidates being registered in the dictionary candidate management unit 23.

In the second embodiment, the attribute items described according to the schemas are specified based on the correspondence relation between the attribute items described according to the different schemas, that is, the dictionary definition item, but the invention is not limited thereto. Instead, the attribute items described according to the schemas may be specified based on the items identifying the schemas.

All or some of the automatically performed processes among the processes described above according to this embodiment may be manually performed.

The illustrated configuration items may not necessarily be physically configured as the configuration items are illustrated. That is, the specific form of the distribution and federation of the respective units are not limited to the illustrated form, but the entirety or a part of the specific form can be distributed or federated functionally or physically by an arbitrary unit depending on various loads or a usage situation.

Figure 15:
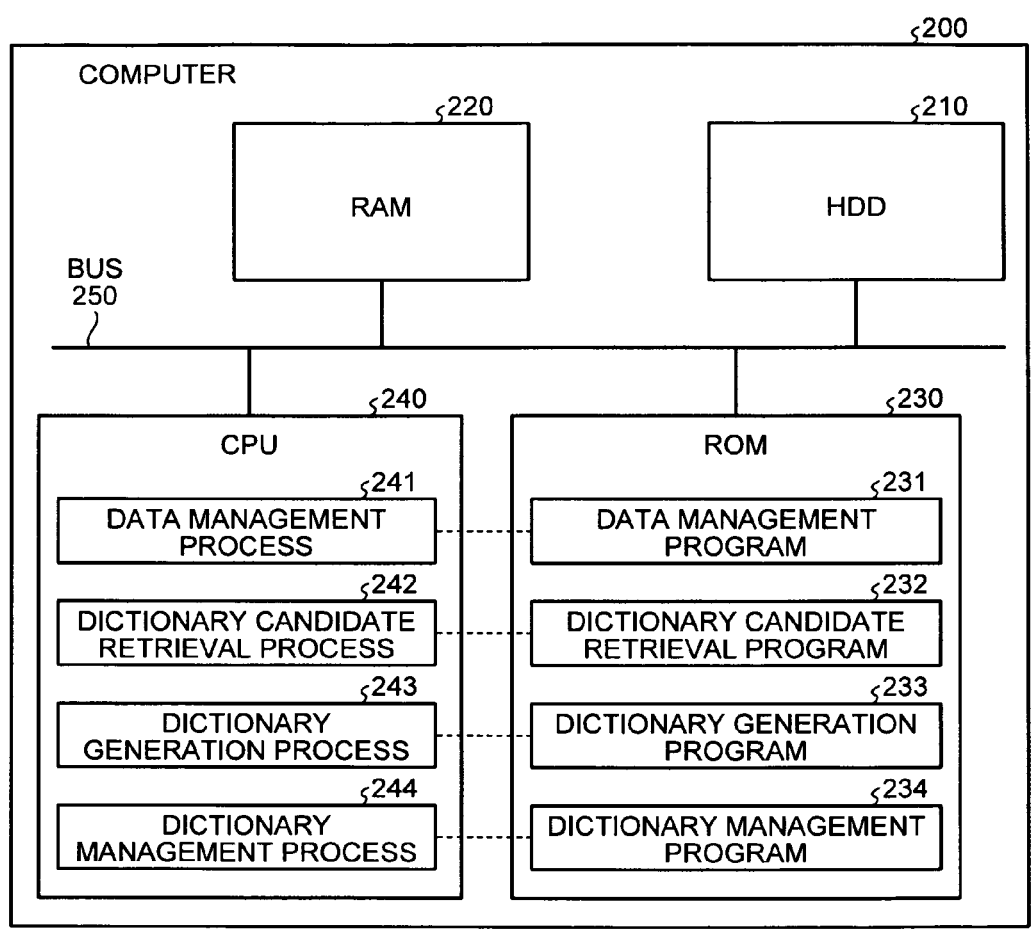
FIG. 15 is an explanatory diagram illustrating a computer executing a dictionary generation program.
Figure 16:
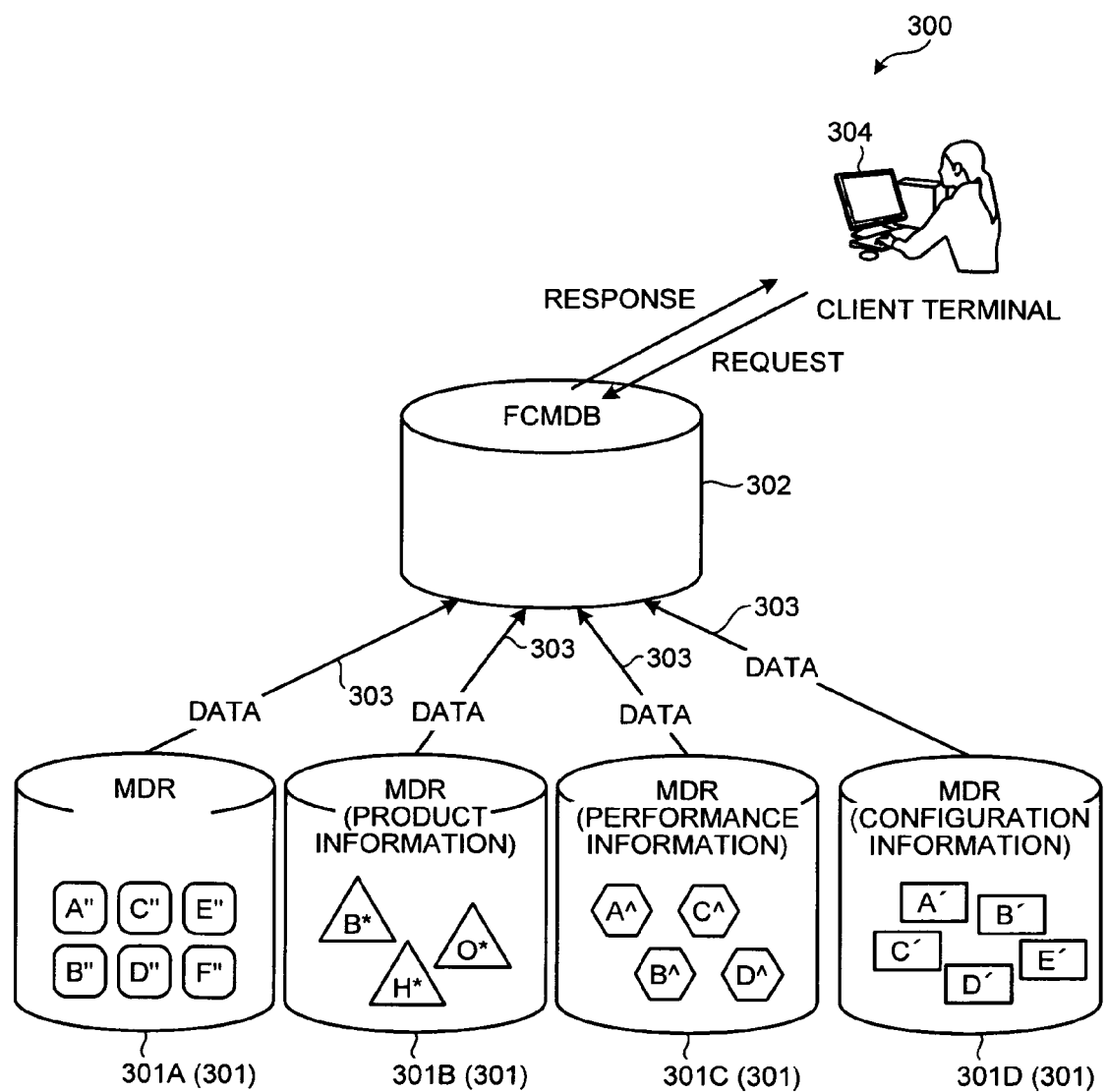
FIG. 16 is an explanatory diagram illustrating the structure of the FCMDB system.
Figure 17:
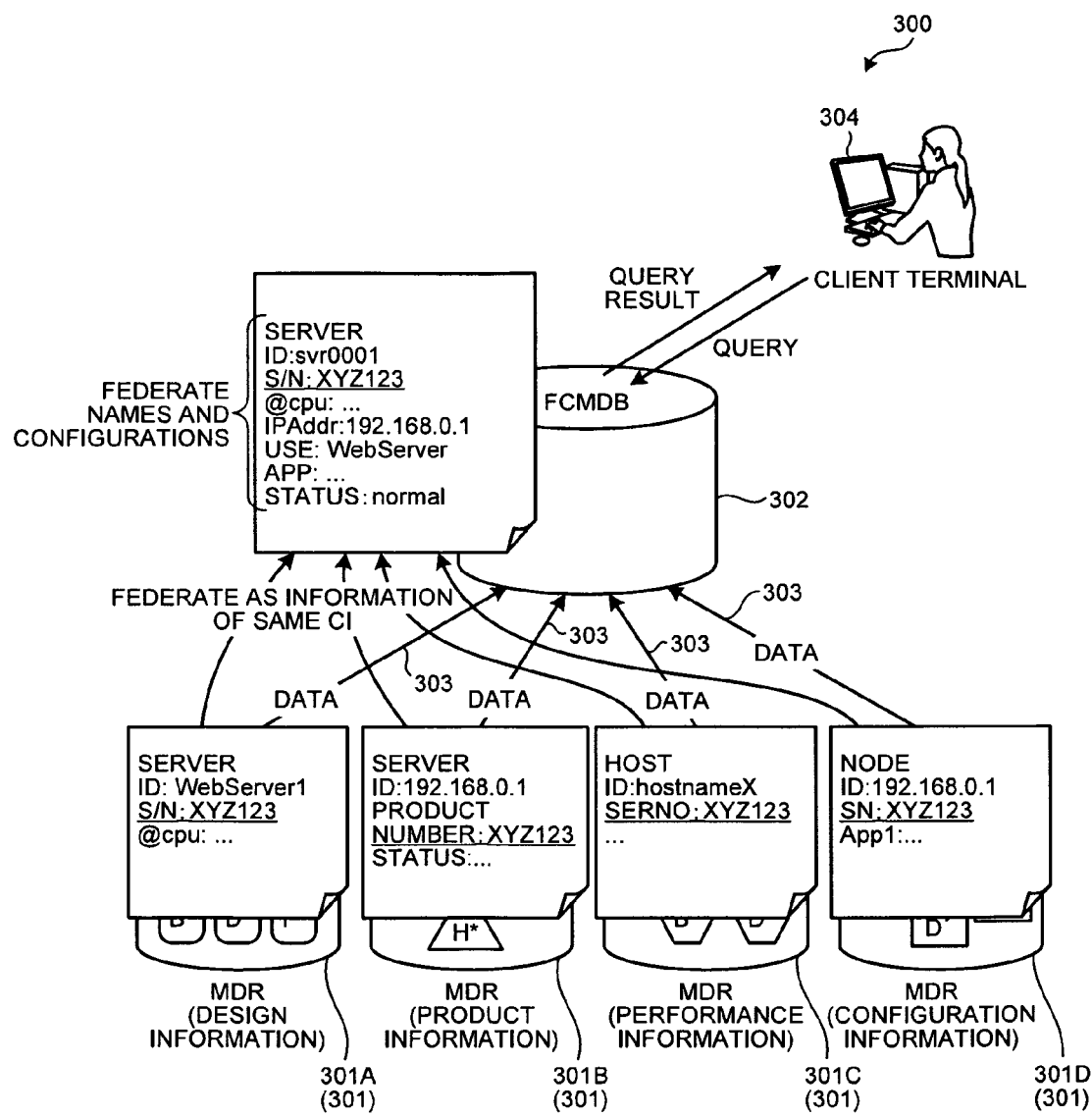
FIG. 17 is an explanatory diagram illustrating a principle of data federation of the FCMDB system.

The various processes described according to this embodiment can be realized by causing a computer to execute a prepared program. Hereinafter, an example of a computer executing a program having the same functions as those of the above-described embodiment will be described with reference to FIG. 15. FIG. 15 is an explanatory diagram illustrating a computer executing a dictionary generation program.

As illustrated in FIG. 15, a computer 200 executing the dictionary generation program includes an HDD (Hard Disk Drive) 210, a RAM 220, a ROM 230, a CPU 240, and a bus 250 connecting them to each other.

A data management program 231, a dictionary candidate retrieval program 232, a dictionary generation program 233, and a dictionary management program 234 having the same functions as those of the above-described embodiment are stored in advance in the ROM 230. The programs 231 to 234 may be appropriately distributed or federated, like the units of the configuration information management apparatus 100 illustrated in FIG. 1.

The CPU 240 reads the programs 231 to 234 from the ROM 230. As a consequence, the programs 231 to 234 function as a data management process 241, a dictionary candidate retrieval process 242, a dictionary generation process 243, and a dictionary management process 244, respectively. The processes 241 to 244 correspond to the data management unit 101, the dictionary candidate retrieval unit 102, the dictionary generation unit 103, and the dictionary management unit 104 illustrated in FIG. 1, respectively.

As illustrated in FIG. 15, the configuration item including the attribute items described according to the different schemas, the dictionary definition items, the dictionary candidates, and the dictionary information are managed in the HDD 210. That is, the CPU 240 of the computer 200 retrieves, as the dictionary candidate, the combination of the attribute names corresponding to the same attribute value as the attribute item of the dictionary definition item described according to the different schemas. Moreover, the CPU 240 generates the dictionary information defining the synonymity between the attribute names of the attribute items of the different schemas and manages the generated dictionary information in the HDD 210. As a consequence, the high-accurate dictionary information can be provided, while considerably reducing the work burden on an operator when the dictionary information of the plurality of schemas is generated.

In an exemplary configuration information management apparatus according to the disclosure, it is possible to obtain an advantage of automatically generating dictionary information of a plurality of schemas, while considerably reducing the work burden on an operator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information management apparatus virtually federating configuration information scattered in operation management middlewares, the configuration information management apparatus comprising:
    a data management unit that stores therein configuration items each having attribute items each including an attribute name and an attribute value described according to different schemas, a same configuration item being described by different attribute names according to the schemas and a same attribute value being associated with different attribute names of the different schemas corresponding to the same configuration item;
    a dictionary candidate retrieval unit that refers to correspondence relation comparing the attribute items of a first schema with the attribute items of a second schema in the same configuration item for each of the configuration items stored in the data management unit, specifies an attribute item of the first schema and an attribute item of the second schema and, when retrieving the attribute name corresponding to the same attribute value between the specified attribute item of the first schema and the specified attribute item of the second schema, retrieves, as a dictionary candidate, a combination of the retrieved attribute name of the attribute item of the first schema and the retrieved attribute name of the attribute item of the second schema from the data management unit;
a dictionary generation unit that generates dictionary information defining synonymity between the attribute names of the attribute items described according to the different schemas based on the dictionary candidate retrieved by the dictionary candidate retrieval unit; and
a dictionary management unit that stores therein the dictionary information generated by the dictionary generation unit.

2. The configuration information management apparatus according to claim 1,
wherein the dictionary candidate retrieval unit specifies the attribute item of the first schema and the attribute item of the second schema in the same configuration item for each of the configuration items, manages, the combination of at least a pair of attribute items, which defines the correspondence relation between the attribute items of the first schema and the second schema, as a dictionary definition item, and retrieves, as the dictionary candidate, the combination of the attribute names corresponding to the same attribute value in the attribute items of the first schema and the second schema from the data management unit based on the dictionary definition item.

3. The configuration information management apparatus according to claim 1, further comprising a dictionary displaying unit that displays the dictionary information generated by the dictionary generation unit on a display screen.

4. The configuration information management apparatus according to claim 2, further comprising a source information acquisition unit that acquires source information of the attribute item,
wherein when the dictionary candidate retrieval unit retrieves the combination of the attribute names of the attribute item corresponding to the same attribute value of the first schema and the second schema, the source information acquisition unit acquires the source information of the attribute items corresponding to the same attribute value, and
wherein when the source information of the attribute items of the dictionary candidate satisfies the same condition, the dictionary candidate retrieval unit retrieves the combination of the attribute items as the dictionary candidate.

5. The configuration information management apparatus according to claim 1, further comprising:
an operation history management unit that stores therein operation histories of the configuration items and the attribute items in the data management unit; and
a dictionary candidate management unit that stores therein the dictionary candidates retrieved by the dictionary candidate retrieval unit,
wherein the dictionary generation unit includes
a history synchronization counter unit that acquires the operation history of each of the dictionary candidates being managed by the dictionary candidate management unit at the same timing of the attribute items of the corresponding dictionary candidate, determines whether data are synchronized in the operation histories of the attribute items, and counts the number of times of history synchronization when the data are synchronized,
a dictionary candidate selection unit that selects the dictionary candidate of a dictionary target from the dictionary candidates being managed by the dictionary candidate management unit based on the number of times of history synchronization for each of the dictionary candidates, and
wherein the dictionary generation unit generates the dictionary information based on the dictionary candidate of the dictionary target selected by the dictionary candidate selection unit.

6. The configuration information management apparatus according to claim 5,
wherein the history synchronization counter unit changes setting of timing of the operation history or setting of the setting number of times, according to a setting operation.

7. The configuration information management apparatus according to claim 5,
wherein the history synchronization counter unit changes setting of timing of the operation history or setting of the setting number of times, depending on a type of the attribute item of determination target.

8. The configuration information management apparatus according to claim 5,
wherein the dictionary candidate selection unit includes
an evaluation value calculation unit that calculates an evaluation value of each of the dictionary candidates based on the number of times of history synchronization for each of the dictionary candidates, and
an evaluation value determination unit that selects the dictionary candidate with the highest evaluation value among the evaluation values of the dictionary candidates among the dictionary candidates being managed by the dictionary candidate management unit, and determines whether the evaluation value of the corresponding dictionary candidate is equal to or greater than a predetermined threshold value, and
wherein the dictionary candidate selection unit selects the dictionary candidate as the dictionary candidate of the dictionary target, when the evaluation determination unit determines that the evaluation value of the dictionary candidate is equal to or greater than the predetermined threshold value.

9. The configuration information management apparatus according to claim 5,
wherein when selecting the dictionary candidate of the dictionary target among the dictionary candidates being managed by the dictionary candidate management unit, the dictionary candidate selection unit deletes the dictionary candidate having the attribute name of the attribute item of the selected dictionary candidate from the dictionary candidate management unit.

10. A dictionary generating method for a configuration information management apparatus which virtually federates configuration information scattered in operation management middlewares, the dictionary generating method comprising:
storing configuration items each having attribute items each including an attribute name and an attribute value described according to different schemas in a data management unit, a same configuration item being described by different attribute names according to the schemas and a same attribute value being associated with different attribute names of the different schemas corresponding to the same configuration item;
referring to correspondence relation comparing the attribute items of a first schema with the attribute items of a second schema in the same configuration item for each of the configuration items stored in the data management unit;

specifying an attribute item of the first schema and an attribute item of the second schema;

retrieving, when retrieving the attribute name corresponding to the same attribute value between the specified attribute item of the first schema and the specified attribute item of the second schema, as a dictionary candidate, a combination of the retrieved attribute name of the attribute item of the first schema and the retrieved attribute name of the attribute item of the second schema from the data management unit;

generating dictionary information defining synonymity between the attribute names of the attribute items described according to the different schemas based on the dictionary candidate; and storing the generated dictionary information in a dictionary management unit.

11. A computer-readable, non-transitory medium storing a dictionary generating program for virtually federating configuration information scattered in operation management middlewares, the dictionary generating program causing a computer to execute a process, the process comprising:

storing configuration items each having attribute items each including an attribute name and an attribute value described according to different schemas in a data management unit, a same configuration item being described by different attribute names according to the schemas and a same attribute value being associated with different attribute names of the different schemas corresponding to the same configuration item;

referring to correspondence relation comparing the attribute items of a first schema with the attribute items of a second schema in the same configuration item for each of the configuration items stored in the data management unit;

specifying an attribute item of the first schema and an attribute item of the second schema;

retrieving, when retrieving the attribute name corresponding to the same attribute value between the specified attribute item of the first schema and the specified attribute item of the second schema, as a dictionary candidate, a combination of the retrieved attribute name of the attribute item of the first schema and the retrieved attribute name of the attribute item of the second schema from the data management unit;

generating dictionary information defining synonymity between the attribute names of the attribute items described according to the different schemas based on the dictionary candidate; and storing the generated dictionary information in a dictionary management unit.

12. An apparatus for virtually federating configuration information scattered in operation management middlewares, the apparatus comprising:

a processor coupled to a memory, wherein the processor is programmed to manage the configuration information by:

storing configuration items each having attribute items each including an attribute name and an attribute value described according to different schemas in a data management unit, a same configuration item being described by different attribute names according to the schemas and a same attribute value being associated with different attribute names of the different schemas corresponding to the same configuration item;

referring to correspondence relation comparing the attribute items of a first schema with the attribute items of a second schema in the same configuration item for each of the configuration items stored in the data management unit;

specifying an attribute item of the first schema and an attribute item of the second schema;

retrieving, when retrieving the attribute name corresponding to the same attribute value between the specified attribute item of the first schema and the specified attribute item of the second schema, as a dictionary candidate, a combination of the retrieved attribute name of the attribute item of the first schema and the retrieved attribute name of the attribute item of the second schema from the data management unit;

generating dictionary information defining synonymity between the attribute names of the attribute items described according to the different schemas based on the dictionary candidate; and storing the generated dictionary information in a dictionary management unit.

\* \* \* \* \*